United States Patent
Ghoul et al.

(10) Patent No.: US 12,344,703 B2
(45) Date of Patent: Jul. 1, 2025

(54) PHOTO RADIATION CURABLE EPOXY FOR ELECTRICAL COMPONENTS

(71) Applicant: Hitachi Energy Ltd, Zürich (CH)

(72) Inventors: Cherif Ghoul, Raleigh, NC (US); Elio Perigo, Wendell, NC (US); Daniel Pierce Armstrong, Apex, NC (US); Kathryn F. Murphy, Raleigh, NC (US); Mohammad O. Tuhin, Houston, TX (US)

(73) Assignee: HITACHI ENERGY LTD, Zürich (CH)

( * ) Notice: Subject to any disclaimer, the term of this patent is extended or adjusted under 35 U.S.C. 154(b) by 716 days.

(21) Appl. No.: 17/627,108

(22) PCT Filed: Jan. 18, 2021

(86) PCT No.: PCT/EP2021/050936
§ 371 (c)(1),
(2) Date: Jan. 13, 2022

(87) PCT Pub. No.: WO2021/151707
PCT Pub. Date: Aug. 5, 2021

(65) Prior Publication Data
US 2022/0251287 A1     Aug. 11, 2022

Related U.S. Application Data

(60) Provisional application No. 62/966,260, filed on Jan. 27, 2020.

(51) Int. Cl.
C08G 59/68     (2006.01)
C08G 59/24     (2006.01)
C08G 65/18     (2006.01)

(52) U.S. Cl.
CPC .......... C08G 59/687 (2013.01); C08G 59/24 (2013.01); C08G 65/18 (2013.01)

(58) Field of Classification Search
None
See application file for complete search history.

(56) References Cited

U.S. PATENT DOCUMENTS

| | | | |
|---|---|---|---|
| 6,174,932 B1 * | 1/2001 | Pachl | C09K 3/10 522/74 |
| 6,277,898 B1 * | 8/2001 | Pachl | C08L 71/02 522/100 |
| 6,350,792 B1 * | 2/2002 | Smetana | C08K 5/0025 522/74 |
| 6,461,691 B1 * | 10/2002 | Taylor | C08L 71/02 522/74 |
| 6,858,260 B2 * | 2/2005 | Taylor | C08G 59/626 522/74 |
| 7,235,593 B2 | 6/2007 | Crivello | |
| 7,456,230 B2 * | 11/2008 | Gan | C09J 163/00 522/170 |
| 9,216,543 B1 * | 12/2015 | Lisitsin | B29C 48/0013 |
| 10,167,409 B2 * | 1/2019 | Lisitsin | B33Y 30/00 |
| 2007/0267134 A1 | 11/2007 | Konarski et al. | |
| 2008/0180501 A1 | 7/2008 | Ookubo et al. | |
| 2013/0187144 A1 | 7/2013 | Briers | |
| 2014/0093699 A1 * | 4/2014 | Xu | G03F 7/038 522/170 |
| 2016/0060398 A1 | 3/2016 | Bae et al. | |

FOREIGN PATENT DOCUMENTS

| | | | | |
|---|---|---|---|---|
| CN | 104345562 A | 2/2015 | | |
| CN | 107698722 A | 2/2018 | | |
| EP | 2502728 A1 | 9/2012 | | |
| EP | 2842980 A1 | 3/2015 | | |
| EP | 3336122 A1 | 6/2018 | | |
| EP | 3597668 A1 * | 1/2020 | ............ | B33Y 10/00 |
| WO | 2006118532 A1 | 11/2006 | | |
| WO | WO 2015/200173 A1 | 12/2015 | | |
| WO | WO 2016/200972 A1 | 12/2016 | | |

OTHER PUBLICATIONS

International Search Report and Written Opinion of the International Searching Authority, PCT/EP2021/050936, mailed Apr. 29, 2021, 11 pages.
Chinese Patent Application No. 202180004490.0, Office Action and Search Report mailed Mar. 30, 2023, 8 pages.

* cited by examiner

*Primary Examiner* — Sanza L. McClendon
(74) *Attorney, Agent, or Firm* — Sage Patent Group

(57) ABSTRACT

An epoxy formulation is provided with improved properties for electrical components exposed to a voltage differential. The improved electrical properties include increased glass transition temperature, increased breakdown strength and/or lower loss factor. Electrical components may be formed from the epoxy formulation by 3D printing the epoxy formulation and curing the formulation with UV radiation. The epoxy formulation includes epoxy, a photoinitiator and an accelerator.

25 Claims, No Drawings

PHOTO RADIATION CURABLE EPOXY FOR ELECTRICAL COMPONENTS

CROSS REFERENCE TO RELATED APPLICATIONS

This application is a 35 U.S.C. § 371 national stage application of PCT International Application No. PCT/EP2021/050936 filed on Jan. 18, 2021, which in turns claims domestic priority to U.S. Provisional Patent Application No. 62/966,260, filed on Jan. 27, 2020, the disclosures and content of which are incorporated by reference herein in their entirety.

BACKGROUND

The present inventions relate generally to epoxy formulations, and particularly, to an epoxy formulation with improved performance in electrical components.

Recently, it has become more common to make various components from epoxy formulations. For example, one method that is growing in use is 3D printing techniques that print an epoxy formulation in a programmed three-dimensional shape. In order to allow the component to be printed in a timely manner in an accurate shape, printed epoxy is often cured as it is printed by irradiating the epoxy formulation with ultraviolet radiation (UV). For example, a laser may be used as the epoxy formulation is printed to apply UV radiation to the epoxy formulation to rapidly cure it.

In order to implement UV curing of epoxy formulations, it may be necessary for the epoxy formulation to include a photoinitiator, which responds to photo radiation. In use, the photoinitiator causes curing of the epoxy when photo radiation is applied to the photoinitiator. One common type of photoinitiator that has been used in epoxy formulations for 3D printing applications are various forms of acrylates. An advantage of using acrylates in epoxy formulations for 3D printing of components is that acrylates cause quick curing of the epoxy upon the application of UV radiation. Components made from epoxy/acrylate formulations have also been found to be suitable for many applications.

However, it has been determined that components made from epoxy/acrylate formulations may have inferior properties when used in electrical components that experience voltage differentials. Thus, it may be useful to provide improved epoxy formulations with improved properties for electrical components.

SUMMARY

An epoxy formulation is described that is photo radiation curable. The epoxy formulation includes a photoinitiator, an accelerator and an epoxy. The epoxy formulation may be formed into an electrical component with 3D printing. The electrical component may have improved electrical properties including glass transition temperature, breakdown strength and loss factor.

DETAILED DESCRIPTION

An improved epoxy formulation for use in photo radiation curing applications may include 1%-6% by weight of a photoinitiator, 3%-20% by weight of an accelerator and at least 50% by weight of an epoxy. More preferably, the portion of the photoinitiator is 1.7%-4% or 1.7%-3% by weight. The portion of the accelerator is more preferably 5%-15% or 5%-10% by weight. The portion of the epoxy formulation is more preferably at least 70% or 80% by weight. The epoxy formulation may also include up to 65% by volume of a filler, such as silica, mica, quartz, calcium carbonate, talc, alumina silicate, alumina, alumina trihydrate or calcium sulfate.

The epoxy formulation may be used in a 3D printing process to form an electrical component. Although a variety of electrical components are possible, some examples include a bushing, a dielectric coating, plug housing and an insulating conduit, among others. It is understood that a bushing is an insulation device that provides electrical isolation to a high voltage line that passes through a grounded barrier, such as a wall or enclosure. A dielectric coating may be used for providing electrical isolation and reducing the creep distance of an electrical component. A plug housing is an insulation barrier for an electrical connector or plug. An insulating conduit may be used for containing electrical wiring and protecting against mechanical, chemical or any other external source of damage.

After curing of the epoxy formulation, an electrical component formed therefrom is exposed to a voltage differential. The glass transition temperature of the cured epoxy is preferably at least 120° C. The electrical breakdown strength of the cured epoxy is preferably at least 25 kV/mm, and more preferably at least 40 kV/mm. The electrical loss factor of the cured epoxy is preferably less than 1%, and more preferably less than 0.2%.

The photoinitiator is preferably a cationic photoinitiator. There are currently few viable routes for anionic photopolymerization of epoxies and oxetanes. Although there are many types of cationic initiators, only two classes of cations are industrially relevant: diaryliodonium cations and triarylsulfonium cations. Iodonium salts primarily absorb in the 220-290 nm wavelength range, and sulfonium salts primarily absorb in the 300-360 nm wavelength range. Iodonium salts have two aryl groups and sulfonium salts have three aryl groups in order to be UV reactive. Due to the production process, another common salt for sulfonium salts contains five aryl groups and two sulfur atoms or four aryl groups and two sulfur atoms within the molecule. However, this is still considered to be "triarylsulfonium" because the reactive cation is bonded to three aryl functional groups. The aryl groups may be substituted with various functional groups for the purpose of improved solubilization in polymer resins. These functionalizations can be symmetric or asymmetric although symmetric may be more common. Common functionalizations to the 4 and 4' aryl carbons are: tert-butyl, methyl, ethyl, propyl, isopropyl, octyl, diaryl sulfide (sulfonium only) and aryl sulfide (sulfonium only). Although there are a large number of substitutions which are possible as long as they are electron withdrawing, most of the substitutions in industrially relevant cationic photoinitiators are linear aliphatic groups. The anion of each salt should be a weak nucleophile and a strong acid, such as a Lewis super acid. Common examples include hexafluoroantimonate ($SbF_6^-$); hexafluorophosphate ($PF_6^-$); tetrafloroborate ($BF_4^-$); tetrakis pentafluorophenylborate ($B(C_6F_5)_4^-$); hexafluoroarsenate ($AsF_6^-$); and tetrakis nonafluoro-tert-butyl aluminate ($Al(C_4F_9)_4^-$). Any combination of these cation/anion pairs may be viable. In practice, the anions that are most useful are $SbF_6^-$, $B(C_6F_5)_4^-$ and $Al(C_4F_9)_4^-$. Compounds of the same general structure may also be substituted. The cationic photoinitiator preferably may be a diaryliodonium cation or a triarylsulfonium cation including triarylsulfonium hexafluoroantimonate, diaryliodonium hexafluoroantimonate, diaryliodonium tetrakis[pentafluorophenyl] borate or high molecular weight sulfonium tetrakis

[pentafluorophenyl] borate. More preferably, the photoinitiator is triarylsulfonium hexafluoroantimonate.

Acrylated oligomers and resins are common for photocuring. Acrylated resins use radical photoinitiators rather than cationic initiators. In some cases, cationic and radical initiators are used together in acrylated resins. The improved epoxy formulation may include an acrylic monomer, acrylated oligomer, acrylated resin or a combination thereof. However, the acrylate content should not exceed 5% by weight as an upper limit. This number includes the total weight fraction of any type of acrylate in the mixture whether that be part of an acrylated resin or an acrylic monomer. Acrylated resin content should not exceed 20% of total resin composition. The composition of an acrylated oligomer should not exceed 50% of the oligomer composition. Most preferably, the improved epoxy formulation has no acrylate portion.

The accelerator is preferably an alcohol, a diol or a polyol as a reactive diluent. More preferably, the accelerator is an oxetane. Oxetanes are common reactive diluents (i.e., having a lower viscosity than the resin and being incorporated into the final epoxy material). Oxetanes can also be used to speed up the curing process. Most preferably, the oxetane is 3-ethyl-3-oxetane methanol. Other oxetanes may also be used, which are preferably reactive diluents with both an oxetane and alcohol group. Examples include oxetane-3-methanol and 3-methyl-3-oxetane methanol. Difunctional oxetanes may be used for a high degree of curing, including bis[1-ethyl(3-oxetanyl)]methyl ether; 1,4-bis[(3-ethyl-3-oxetanylmethoxy)methyl]benzene, 3-ethyl-3-[(2-ethylhexyloxy)methyl]oxetane; dimethyloxetane; phenyloxetane; trimethylene oxide; methyl-3-oxetane; ethyl-3-oxetane; a long chain alkyl substituted oxetane (propyl, butyl, pentyl, hexyl, hepyl, octyl substituted); 3-hydroxyoxetane; 3,3-oxetanedimethanol; 2,6-dioxaspiro3.3heptane. Additional examples of oxetanes that may be used are provided in U.S. Pat. No. 7,235,593, which is incorporated herein by reference.

The epoxy is preferably a cycloaliphatic epoxy. Cycloaliphatics are more resistant to UV degradation and are fast reacting when compared to aromatic epoxy resins. While there are several cycloaliphatic epoxies available, epoxies containing the functional group epoxycyclohexane are much faster curing and are preferred for 3D printing. Examples include 3,4-epoxycyclohexylmethyl-3',4'-epoxycyclohexane carboxylate; epoxycyclohexane (also referred to as cyclohexyl oxirane or oxirane cyclohexane) which is a reactive diluent; or combinations thereof. Glycidyl epoxy functional groups are not as fast curing and therefore are not as useful for high $T_g$ 3D printing resins. Most aromatic epoxies are glycidyl epoxies as well and are not as useful for rapid curing with cationic UV initiated polymerization.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An electrical component comprising a photo radiation curable epoxy formulation, comprising:
   1%-6% by weight of a photoinitiator;
   3%-20% by weight of an accelerator;
   at least 50% by weight of an epoxy, wherein the epoxy formulation after UV curing forms an electrical component exposed to a voltage differential, wherein the electrical component is formed by 3D printing the epoxy formulation; and
   a filler comprising silica, mica, quartz, calcium carbonate, talc, alumina silicate, alumina, alumina trihydrate or calcium sulfate, wherein the filler is an amount up to 65% by volume.

2. The electrical component according to claim 1, wherein the photoinitiator comprises a cationic photoinitiator.

3. The electrical component according to claim 2, wherein the cationic photoinitiator comprises a diaryliodonium cation or a triarylsulfonium cation.

4. The electrical component according to claim 3, wherein the diaryliodonium cation or the triarylsulfonium cation comprises a triarylsulfonium hexafluoroantimonate, diaryliodonium hexafluoroantimonate, diaryliodonium tetrakis [pentafluorophenyl] borate or high molecular weight sulfonium tetrakis[pentafluorophenyl] borate.

5. The electrical component according to claim 1, wherein the photoinitiator comprises triarylsulfonium hexafluoroantimonate.

6. The electrical component according to claim 1, wherein the accelerator comprises an alcohol, a diol or a polyol.

7. The electrical component according to claim 1, wherein the accelerator comprises an oxetane.

8. The electrical component according to claim 7, wherein the oxetane comprises 3-ethyl-3-oxetane methanol; oxetane-3-methanol; or 3-methyl-3-oxetane methanol.

9. The electrical component according to claim 7, wherein the oxetane comprises bis[1-ethyl (3-oxetanyl)]methyl ether; 1,4-bis[(3-ethyl-3-oxetanylmethoxy) methyl]benzene; 3-ethyl-3-[(2-ethylhexyloxy) methyl]oxetane; dimethyloxetane; phenyloxetane; trimethylene oxide; methyl-3-oxetane; ethyl-3-oxetane; a long chain alkyl substituted oxetane; 3-hydroxyoxetane; 3,3-oxetanedimethanol; or 2,6-dioxaspiro3.3heptane.

10. The electrical component according to claim 1, wherein the epoxy is a cycloaliphatic epoxy.

11. The electrical component according to claim 10, wherein the cycloaliphatic epoxy comprises 3,4-epoxycyclohexylmethyl-3',4'-epoxycyclohexane carboxylate; epoxycyclohexane; or a combination thereof.

12. The electrical component according to claim 1, further comprising less than 5% by weight of an acrylate monomer, acrylated oligomer, acrylated resin or a combination thereof.

13. The electrical component according to claim 12, having no portion of an acrylate.

14. The electrical component according to claim 1, wherein the epoxy formulation after UV curing has a glass transition temperature of at least 120° C.

15. The electrical component according to claim 1, wherein the epoxy formulation after UV curing has an electrical breakdown strength of at least 25 kV/mm.

16. The electrical component according to claim 15, wherein the epoxy formulation after UV curing has an electrical breakdown strength of at least 40 kV/mm.

17. The electrical component according to claim 1, wherein the epoxy formulation after UV curing has an electrical loss factor of less than 1%.

18. The electrical component according to claim 17, wherein the epoxy formulation after UV curing has an electrical loss factor of less than 0.2%.

19. The electrical component according to claim 1, wherein the electrical component comprises a bushing, a dielectric coating, a plug housing, or an insulating conduit.

20. The electrical component according to claim 1, wherein the photoinitiator comprises 1.7%-4% by weight.

21. The electrical component according to claim 20, wherein the photoinitiator comprises 1.7%-3% by weight.

22. The electrical component according to claim 1, wherein the accelerator comprises 5%-15% by weight.

23. The electrical component according to claim 22, wherein the accelerator comprises 5%-10% by weight.

24. The electrical component according to claim 1, wherein the epoxy comprises at least 70% by weight.

25. The electrical component according to claim 24, wherein the epoxy comprises at least 80% by weight.

\* \* \* \* \*